US008185614B2

(12) United States Patent
Leggette et al.

(10) Patent No.: US 8,185,614 B2
(45) Date of Patent: May 22, 2012

(54) SYSTEMS, METHODS, AND APPARATUS FOR IDENTIFYING ACCESSIBLE DISPERSED DIGITAL STORAGE VAULTS UTILIZING A CENTRALIZED REGISTRY

(75) Inventors: Wesley Leggette, Oak Park, IL (US); Zachary J. Mark, Chicago, IL (US); John Quigley, Chicago, IL (US); Manish Motwani, Chicago, IL (US); Srinivas Palthepu, Naperville, IL (US)

(73) Assignee: Cleversafe, Inc., Chicago, IL (US)

( * ) Notice: Subject to any disclaimer, the term of this patent is extended or adjusted under 35 U.S.C. 154(b) by 199 days.

(21) Appl. No.: 12/648,497

(22) Filed: Dec. 29, 2009

(65) Prior Publication Data
US 2010/0169415 A1    Jul. 1, 2010

Related U.S. Application Data

(63) Continuation-in-part of application No. 11/973,621, filed on Oct. 9, 2007, now Pat. No. 7,904,475.

(60) Provisional application No. 61/141,494, filed on Dec. 30, 2008.

(51) Int. Cl.
G06F 15/16    (2006.01)

(52) U.S. Cl. .......... 709/220; 709/224; 709/228

(58) Field of Classification Search .......... 709/220, 709/224, 228
See application file for complete search history.

(56) References Cited

U.S. PATENT DOCUMENTS

| 6,571,282 | B1* | 5/2003 | Bowman-Amuah | 709/219 |
| 7,502,501 | B2* | 3/2009 | Joshi | 382/128 |
| 7,546,427 | B2* | 6/2009 | Gladwin et al. | 711/154 |
| 7,577,616 | B2* | 8/2009 | Zhu | 705/59 |
| 7,904,475 | B2* | 3/2011 | Gladwin et al. | 707/781 |
| 2004/0111559 | A1* | 6/2004 | Heil | 711/114 |
| 2007/0130085 | A1* | 6/2007 | Zhu | 705/75 |
| 2007/0206673 | A1* | 9/2007 | Cipolli et al. | 375/240.1 |
| 2007/0214285 | A1* | 9/2007 | Au et al. | 709/246 |
| 2007/0226224 | A1* | 9/2007 | Wanigasekara-Mohotti et al. | 707/10 |

* cited by examiner

*Primary Examiner* — Khanh Dinh
(74) *Attorney, Agent, or Firm* — Garlick & Markison; Timothy W. Markison

(57) ABSTRACT

A centralized depository for storing information regarding a collection of servers and other hardware used to implement a plurality of virtual dispersed data storage containers is disclosed. The centralized depository describes each virtual dispersed data storage container as well as the hardware used to provide the plurality of virtual dispersed data storage containers. Computers operating on or seeking to access specific virtual dispersed data storage containers can obtain the information required for access from the centralized depository.

13 Claims, 12 Drawing Sheets

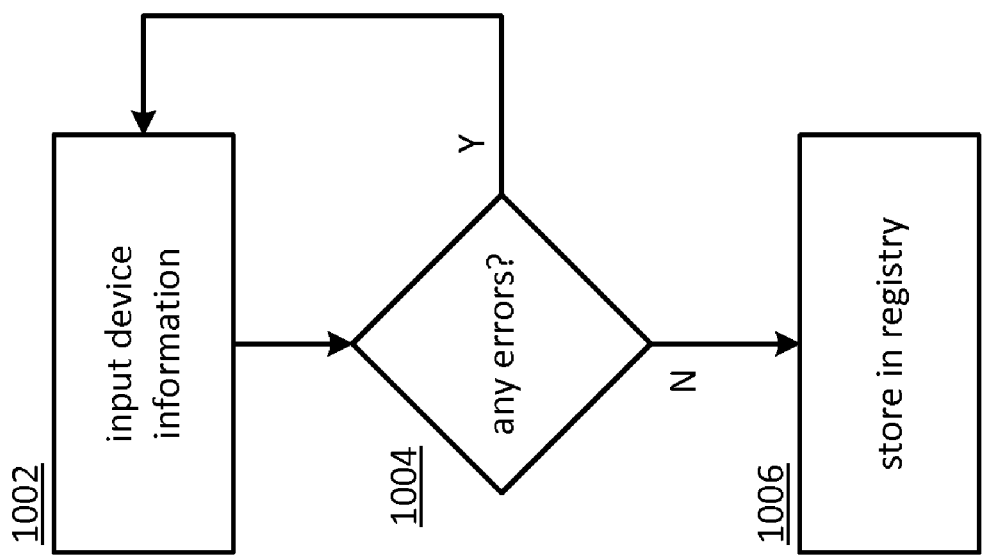

SYSTEMS, METHODS, AND APPARATUS FOR IDENTIFYING ACCESSIBLE DISPERSED DIGITAL STORAGE VAULTS UTILIZING A CENTRALIZED REGISTRY

CROSS-REFERENCE TO RELATED APPLICATIONS

The present U.S. Utility Patent Application claims priority pursuant to 35 U.S.C. §119(e) to U.S. Provisional Application Ser. No. 61/141,494, entitled "Systems, Methods and Apparatus for Identifying Accessible Dispersed Digital Storage Vaults Utilizing a Centralized Registry,", filed Dec. 30, 2008, pending, which is hereby incorporated herein by reference in its entirety and made part of the present U.S. Utility Patent Application for all purposes.

The present U.S. Utility Patent Application claims priority pursuant to 35 U.S.C. §120, as a continuation-in-part (CIP), to U.S. Utility application Ser. No. 11/973,621, entitled "Virtualized Data Storage Vaults on a Dispersed Data Storage Network,", filed Oct. 9, 2007, now U.S. Pat. No. 7,904,475, which is hereby incorporated herein by reference in its entirety and made part of the present U.S. Utility Patent Application for all purposes.

The following applications are also incorporated by reference in their entirety:
1. U.S. Utility application Ser. No. 11/973,613, entitled "Block Based Access To A Dispersed Data Storage Network", filed Oct. 9, 2007.
2. U.S. Utility application Ser. No. 11/973,622, entitled "Smart Access To A Dispersed Data Storage Network", filed Oct. 9, 2007.
3. U.S. Utility application Ser. No. 11/973,542, entitled "Ensuring Data Integrity On A Dispersed Storage Network", filed Oct. 9, 2007.
4. U.S. Utility application Ser. No. 11/973,621, entitled "Virtualized Storage Vaults on a Dispersed Data Storage Network", filed Oct. 9, 2007.
5. U.S. Utility application Ser. No. 11/241,555, entitled "System, Methods, And Apparatus For Subdividing Data For Storage In A Dispersed Data Storage Grid", filed Sep. 30, 2005.
6. U.S. Utility application Ser. No. 11/403,684, entitled "Billing System for Information Dispersal System", filed Apr. 13, 2006.
7. U.S. Utility application Ser. No. 11/404,071, entitled "Metadata Management System for an Information Dispersed Storage System", Apr. 13, 2006.
8. U.S. Utility application Ser. No. 11/403,391, entitled "System for Rebuilding Dispersed Data", filed Apr. 13, 2006.
9. U.S. Utility application Ser. No. 12/080,042, entitled "Rebuilding Data On A Dispersed Storage Network", filed Mar. 31, 2008.

FIELD OF THE INVENTION

The present invention relates generally to systems, apparatus, and methods for distributed data storage, and more particularly to systems, apparatus, and methods for distributed data storage using an information dispersal algorithm so that no one location will store an entire copy of stored data, and more particularly still to systems, apparatus, and methods for identifying of one or more accessible virtual dispersed data storage containers.

DESCRIPTION OF THE PRIOR ART

Storing data in digital form is a well-known problem associated with all computer systems, and numerous solutions to this problem are known in the art. The simplest solution involves merely storing digital data in a single location, such as a punch film, hard drive, or FLASH memory device. However, storage of data in a single location is inherently unreliable. The device storing the data can malfunction or be destroyed through natural disasters, such as a flood, or through a malicious act, such as arson. In addition, digital data is generally stored in a usable file, such as a document that can be opened with the appropriate word processing software, or a financial ledger that can be opened with the appropriate spreadsheet software. Storing an entire usable file in a single location is also inherently insecure as a malicious hacker need only compromise that one location to obtain access to the usable file.

To address reliability concerns, digital data is often "backed-up," i.e., an additional copy of the digital data is made and maintained in a separate physical location. For example, a backup tape of all network drives may be made by a small office and maintained at the home of a trusted employee. When a backup of digital data exists, the destruction of either the original device holding the digital data or the backup will not compromise the digital data. However, the existence of the backup exacerbates the security problem, as a malicious hacker can choose between two locations from which to obtain the digital data. Further, the site where the backup is stored may be far less secure than the original location of the digital data, such as in the case when an employee stores the tape in their home.

Another method used to address reliability and performance concerns is the use of a Redundant Array of Independent Drives ("RAID"). RAID refers to a collection of data storage schemes that divide and replicate data among multiple storage units. Different configurations of RAID provide increased performance, improved reliability, or both increased performance and improved reliability. In certain configurations of RAID, when digital data is stored, it is split into multiple stripes, each of which is stored on a separate drive. Data striping is performed in an algorithmically certain way so that the data can be reconstructed. While certain RAID configurations can improve reliability, RAID does nothing to address security concerns associated with digital data storage.

One method that prior art solutions have used to address security concerns is encryption. Encrypted data is mathematically coded so that only users with access to a certain key can decrypt and use the data. Common forms of encryption include DES, AES, RSA, and others. While modern encryption methods are difficult to break, numerous instances of successful attacks are known, some of which have resulted in valuable data being compromised.

Files are usually organized in file systems, which are software components usually associated with an operating system. Typically, a file system provides means for creating, updating, maintaining, and hierarchically organizing digital data. A file system accepts digital data of arbitrary size, segments the digital data into fixed-size blocks, and maintains a record of precisely where on the physical media data is stored and what file the data is associated with. In addition, file systems provide hierarchical directory structures to better organize numerous files.

Various interfaces to storage devices are also well known in the art. For example, Small Computer System Interface ("SCSI") is a well known family of interfaces for connecting and transferring data between computers and peripherals, including storage. There are also a number of standards for transferring data between computers and storage area networks ("SAN"). For example, Fibre Channel is a networking technology that is primarily used to implement SANs. Fibre Channel SANS can be accessed through SCSI interfaces via Fibre Channel Protocol ("FCP"), which effectively bridges Fibre Channel to higher level protocols within SCSI. Internet Small Computer System Interface ("iSCSI"), which allows the use of the SCSI protocol over IP networks, is an alternative to FCP, and has been used to implement lower cost SANs using Ethernet instead of Fibre Channel as the physical connection. Interfaces for both FCP and iSCSI are available for many different operating systems, and both protocols are widely used. The iSCSI standard is described in "Java iSCSI Initiator," by Volker Wildi, and Internet Engineering Task Force RFC 3720, both of which are hereby incorporated by reference.

In 1979, two researchers independently developed a method for splitting data among multiple recipients called "secret sharing." One of the characteristics of secret sharing is that a piece of data may be split among n recipients, but cannot be known unless at least t recipients share their data, where $n \geq t$. For example, a trivial form of secret sharing can be implemented by assigning a single random byte to every recipient but one, who would receive the actual data byte after it had been bitwise exclusive orred with the random bytes. In other words, for a group of four recipients, three of the recipients would be given random bytes, and the fourth would be given a byte calculated by the following formula:

$$s' = s \oplus r_a \oplus r_b \oplus r_c,$$

where s is the original source data, $r_a$, $r_b$, and $r_c$ are random bytes given to three of the four recipients, and s' is the encoded byte given to the fourth recipient. The original byte s can be recovered by bitwise exclusive-orring all four bytes together.

The problem of reconstructing data stored on a digital medium that is subject to damage has also been addressed in the prior art. In particular, Reed-Solomon and Cauchy Reed-Solomon coding are two well-known methods of dividing encoded information into multiple slices so that the original information can be reassembled even if all of the slices are not available. Reed-Solomon coding, Cauchy Reed-Solomon coding, and other data coding techniques are described in "Erasure Codes for Storage Applications," by Dr. James S. Plank, which is hereby incorporated by reference.

Traditional disk-oriented file systems offer the ability to store and retrieve user-visible files, directories and their metadata. In addition to this data, and transparent to the file system user, is the file system structural data which is comprised of various elements of concern to the file system itself or its immediate execution context of the operating system kernel. File system structural data (often called the superblock in UNIX parlance) is composed of such things as the magic number identifying the file system, vital numbers describing geometry, statistics and behavioral tuning parameters and a pointer to the tree's root. This has various implications, the most crucial of which being that a file system cannot "bootstrap" itself, or bring itself online, if the superblock were to ever become corrupt.

Schemes for implementing dispersed data storage networks ("DDSNs"), which are also known as dispersed data storage grids, are also known in the art. In particular, U.S. Pat. No. 5,485,474, issued to Michael O. Rabin, describes a system for splitting a segment of digital information into n data slices, which are stored in separate devices. When the data segment must be retrieved, only m of the original data slices are required to reconstruct the data segment, where n>m.

Directory services are also known in the art. Directory services are software systems that store and provide access to information, usually organized in a hierarchical fashion. A well known example of a directory service is the Internet Domain Name System ("DNS"), which provides a distributed mapping between human readable Uniform Resource Locators and IP addresses.

Lightweight Directory Access Protocol ("LDAP") is a protocol for accessing directory services over TCP/IP. It provides a number of operations that are common to directory services, and is commonly used to access different directory services. LDAP is fully explained in RFCs 4510-4519 issued by the Internet Engineering Task Force during June of 2006, and hereby incorporated by reference in their entirety.

In October of 2007, Cleversafe, Inc., of Chicago, Ill. implemented the use of "digital storage vaults," the first known mechanism for implementing a plurality of virtualized dispersed data storage networks using one set of slice servers, access computers, etc. Using the October 2007 Cleversafe product, a network administrator could define a number of virtual dispersed data storage networks that an office or workgroup would have access to, and then further define which accounts or groups would have access to specific virtual dispersed data storage networks. These virtual dispersed data storage networks would appear as virtual drives on a user's computer. While a significant step beyond other prior art solutions, network administration was still labor intensive, as the administrator still had to define a digital storage vault, i.e., an accessible dispersed data storage container along with the associated parameters, for each machine providing access to the digital storage vault, such as a grid access computer or a client computer.

OBJECTS OF THE INVENTION

Accordingly, it is an object of this invention to provide a system, apparatus, and method for identifying one or more accessible virtual dispersed data storage networks.

Another object of the invention is to provide a system, apparatus, and method for administrating a plurality of virtual dispersed data storage networks implemented using a common set of servers.

Other advantages of the disclosed invention will be clear to a person of ordinary skill in the art. It should be understood, however, that a system, method, or apparatus could practice the disclosed invention while not achieving all of the enumerated advantages, and that the protected invention is defined by the claims.

SUMMARY OF THE INVENTION

The disclosed invention achieves its objectives by providing a centralized depository for information regarding a collection of servers and other hardware used to implement a plurality of Virtual Dispersed Data Storage Containers ("VDDSCs") which are otherwise known as vaults, on a dispersed data storage network. The centralized depository includes information describing each separate vault stored on the collection of hardware, the configuration of all devices, such as slice servers, access computers, etc., included within the collection of hardware, and vault deployment information. A system is disclosed for identifying accessible virtual dispersed data storage containers implemented by a plurality of slice servers. A first computer including a network port is adaptively coupled to a network, and runs a registry application. The first computer accesses a database storing a plurality of information records describing the configuration of a collection of hardware implementing one or more virtual dispersed data storage containers. A second computer then sends a message to the registry application of the first computer, which sends a second message to the second computer based on one or more of the plurality of information records. In another embodiment, the first message requests identification of a specific virtual dispersed data storage container and the second message identifies the specified virtual dispersed data storage container. An additional embodiment provides for the first message to request the identification of all accessible virtual dispersed data storage containers, and the second message responds with an enumeration of the accessible virtual dispersed data storage containers.

Other specific features of the disclosed invention include the management of virtual dispersed data storage containers, such as creation, removal, and modification of vaults, as well as the management of devices and interfaces deployed to implement one or more virtual dispersed data storage containers.

BRIEF DESCRIPTION OF THE DRAWINGS

Although the characteristic features of this invention will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

FIG. 10 is a simplified flow chart illustrating the process of checking for errors in input device information as implemented by one embodiment of the disclosed invention;

DETAILED DESCRIPTION OF THE ILLUSTRATED EMBODIMENT

Figure 1:
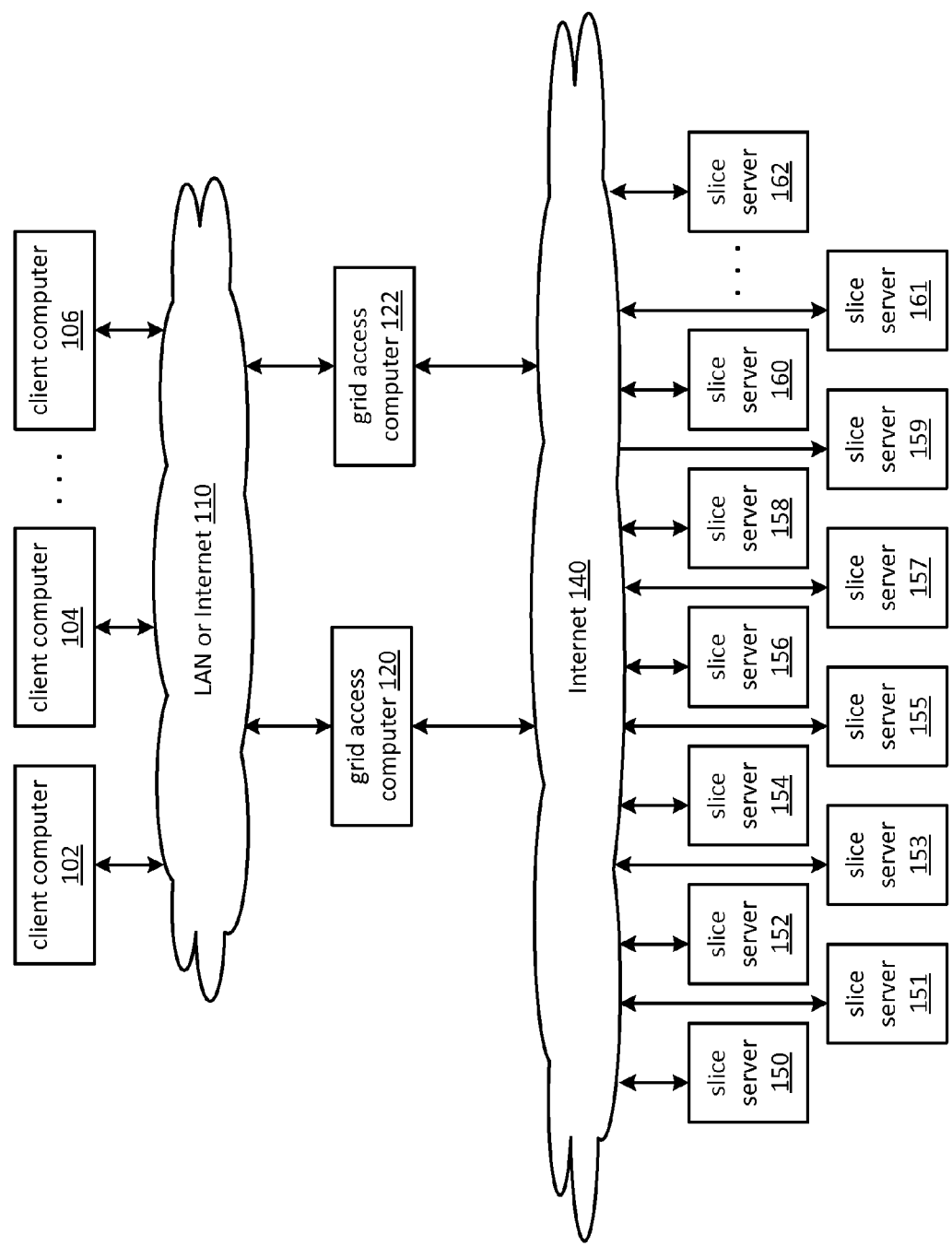
FIG. 1 is a network diagram of a dispersed data storage network constructed in accordance with an embodiment of the disclosed invention.

Turning to the Figures and to FIG. 1 in particular, a distributed computer system implementing a dispersed data storage grid is shown. An arbitrary number of slice servers 150-162 store data slices sent to them by networked client computers 102, 104, and 106. As illustrated, some number of grid access computers 120 and 122 allows access to the slice servers 150-162 by the client computers 102, 104, and 106. Data segments are written to the grid by client computers 102, 104, and 106. In accordance with an information dispersal algorithm, the data segments are sliced into multiple data slices that are then stored on slice servers 150-162.

As explained herein, the disclosed invention allows a network of slice servers to implement numerous virtual dispersed data storage containers. In accordance with the disclosed invention, a subset of the available slice servers 150-162 is associated with a virtual dispersed data storage container, which is in turn associated with a user account. This information is stored in an accessible location, such as a grid access computer 120 and 122, on each client computer 102, 104, and 106, or elsewhere. This software construct, which is referred to herein as a "vault," allows for numerous VDDSCs to be implemented from a network of slice servers. Each vault makes use of some number of slice servers, and a particular slice server may be associated with any number of vaults. There is no fixed relation between slice servers comprising a vault, except by the vault construct itself. By example, a first vault may be comprised of 16 slice servers. A second vault may utilize 4 slice servers in common with the first vault, and an additional 8 that are not used by the first vault.

In addition to storing information about what slice servers make up a particular VDDSC, a vault will also store other information pertinent to the operation of a VDDSC. This information includes what information dispersal algorithm ("IDA") is used on the VDDSC, as well as the information required to operate the particular IDA, such as the number of slices that each data segment is divided into as well, which is also referred to as the quantity n, and the minimum number of data slices required to reconstruct a stored data segment, which is also referred to as the quantity m.

The vault also conglomerates other information that is relevant to the operation of a VDDSC. The total storage in bytes or some other data unit that is available in a particular vault is stored, as well as the amount of storage that is presently occupied by data segments. In a fee-for-service system, this will prevent a particular user from using more storage than was paid for. In addition, a particular vault may require that data be encrypted, either before it is sliced, after it is sliced, or both before and after it is sliced. Accordingly, the vault structure can contain a field indicating that data segments and/or data slices are encrypted, as well as the particular algorithm that is used for encryption.

For certain applications, data stored on a VDDSC may be compressed to increase the total amount of storage available. However, the use of compression can increase the time required to write and retrieve data. Accordingly, the vault can contain a field indicating if compression is to be used, and what type of compression should be used. In addition, while almost every VDDSC makes use of integrity checks, certain applications may be better served by different types of integrity checks. For this purpose, the vault may contain a field allowing a user to specify a specific type of integrity check to be used for stored data segments as well as for stored data slices.

In addition to storing information about the particular slice servers associated with a vault, a vault may also include an access control list specifying which accounts are allowed to access the vault, and what permissions are associated with that account. For example, one user may have full access to a vault, while another user may only be allowed to read data segments from the vault, and not write data segments to, or modify data segments stored on the vault.

Figure 2B:
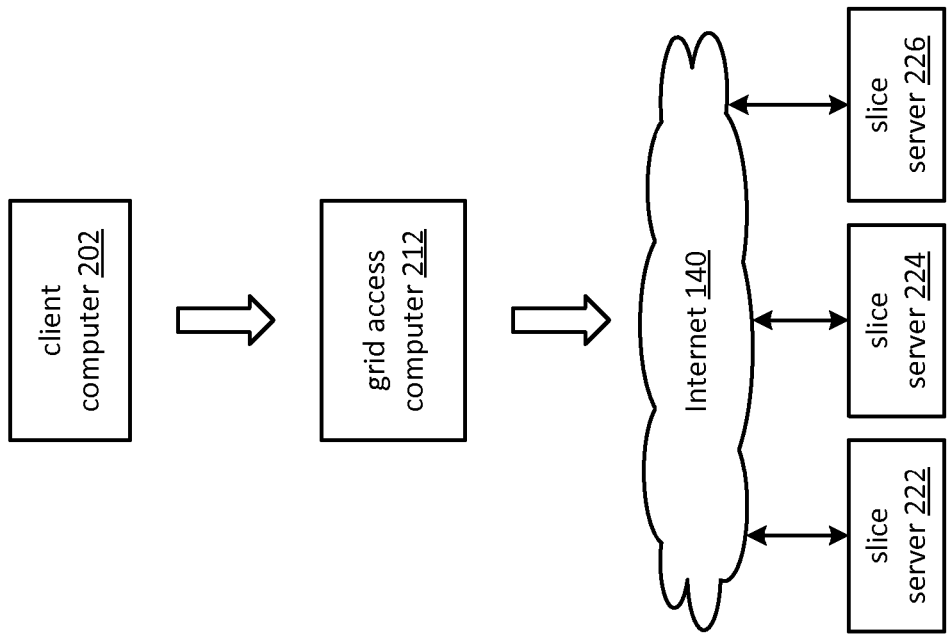
FIG. 2 is a simplified network diagram of the operation of one aspect of the disclosed invention by which a plurality of dispersed data storage networks can be implemented from a set of slice servers.
Figure 2A:
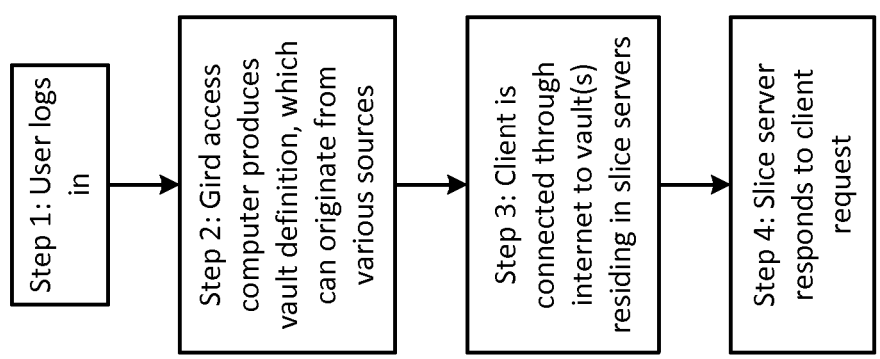

FIG. 2 explains the process of how access to a VDDSC is handled through a vault. A user logs into a particular account at a client computer 202. As part of the login process, a grid access computer 212 loads a vault definition, which may be resident on the grid access computer 212, stored on the slice servers 222, 224, and 226 as distributed data, or stored elsewhere. The vault structure moderates access to a VDDSC comprised of slice servers 222, 224, and 226 by the client computer 202.

Figure 3:
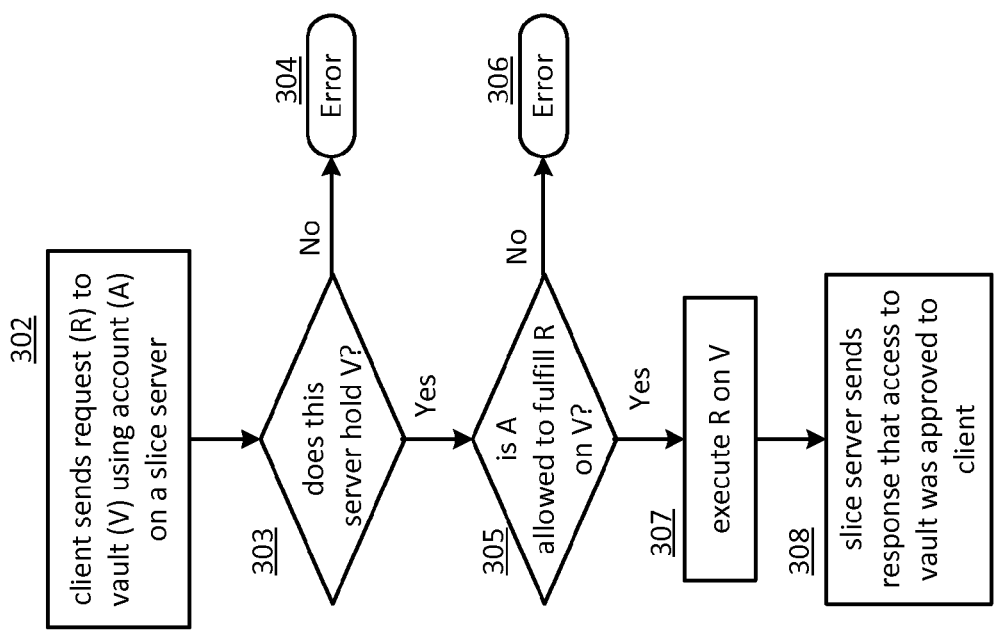
FIG. 3 is a flowchart illustrating the process by which a slice server authenticates requests received from various computers accessing a dispersed data storage network.

FIG. 3 illustrates the process by which a slice server authenticates a request from an access computer. After a client has logged into a vault on an access computer, an access computer will originate one or more requests in step 302. Those requests will be directed to the appropriate slice server, and the slice server will validate that it can accept requests from the vault identified in the request in step 303. If the slice server cannot accept requests from the identified vault, an error is generated in step 304. The slice server also validates that the account identified in the request is allowed to make the specified request in step 305. If the slice server accepts requests from the identified vault and the identified account is allowed to make the specified request, the slice server will execute the request in step 307, and send a response back to the requesting client in step 308.

Figure 4:
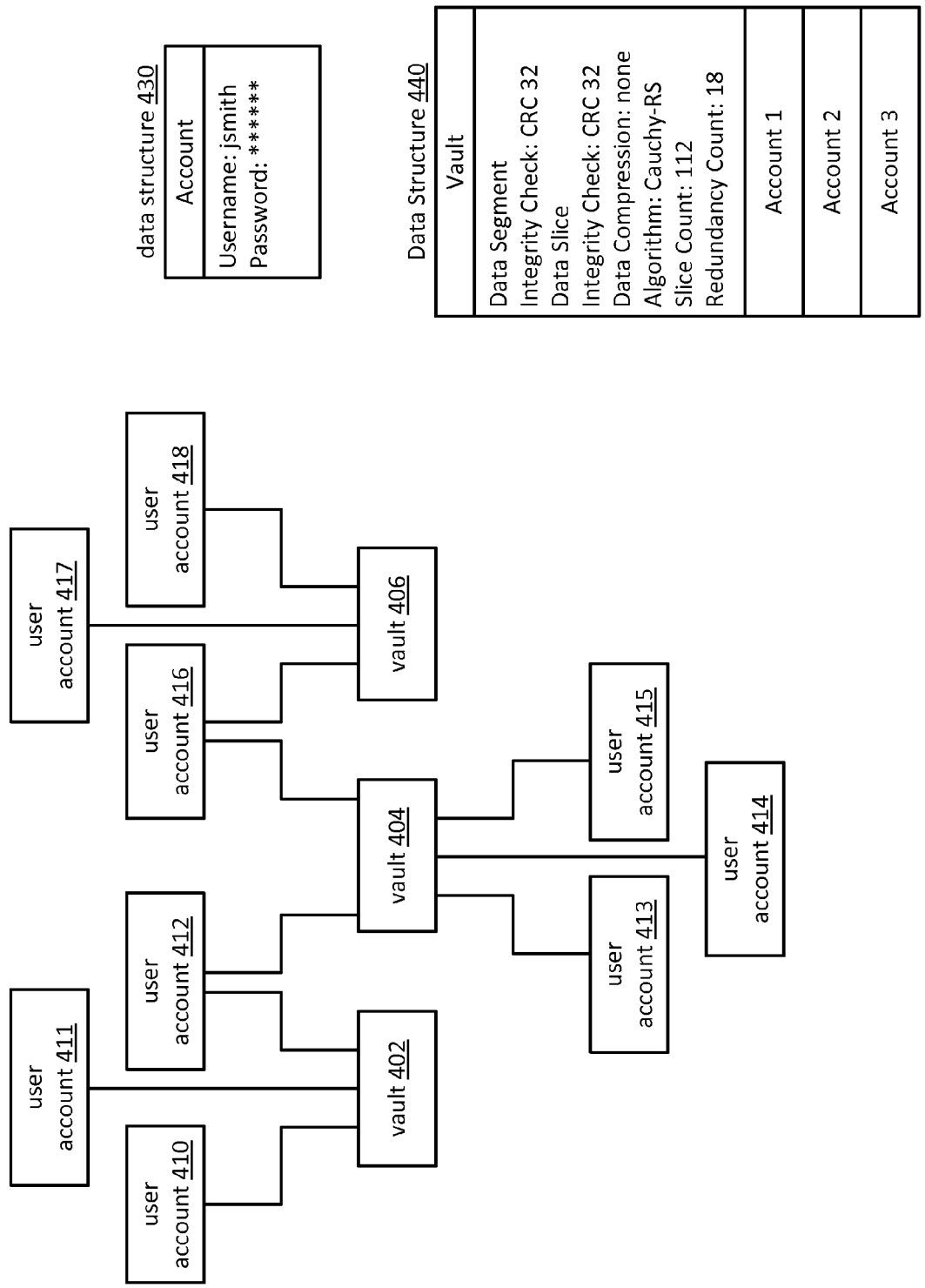
FIG. 4 is a data relationship diagram illustrating the relationship between user accounts and virtualized data storage vaults, as well as the structure of account and vault constructs.

FIG. 4 illustrates the relationship between user accounts and vaults. Three vaults 402, 404, and 406 are depicted, as well as nine users 410-418. Users 410, 411, and 412 have access to vault 402. User 412 also has access to vault 2, and as indicated, there is a many to many relationship between vaults and user accounts. Data structure 440 illustrates one way that vault information could be maintained. In particular, the illustrated structure shows the information dispersal algorithm used on the VDDSC associated with the vault, e.g., Cauchy-Reed Solomon. In addition, the information dispersal parameters are identified, i.e., data segments are divided into 112 data slices, of which any 18 may be lost without compromising the integrity of the stored data. Further, the vault data structure shows that no data compression is used, and that CRC-32 is used as an integrity check for both stored data segments and stored data slices. As illustrated, the data structure 440 does not indicate if stored data is encrypted, although alternative data structures could. Finally, data structure 440 lists three accounts that are allowed to access this particular vault. In addition to listing the associated accounts, the permissions granted to those accounts could also be listed here as well. As permissions are well-known in the art, they are not discussed further here.

FIG. 4 also shows data structure 430, which illustrates one way that a user account could be represented, namely by a username and a password. However, this particular representation of a user account is not a limitation of the invention; other methods well-known in the prior art would work just as well, for instance, biometric information.

Figure 5:
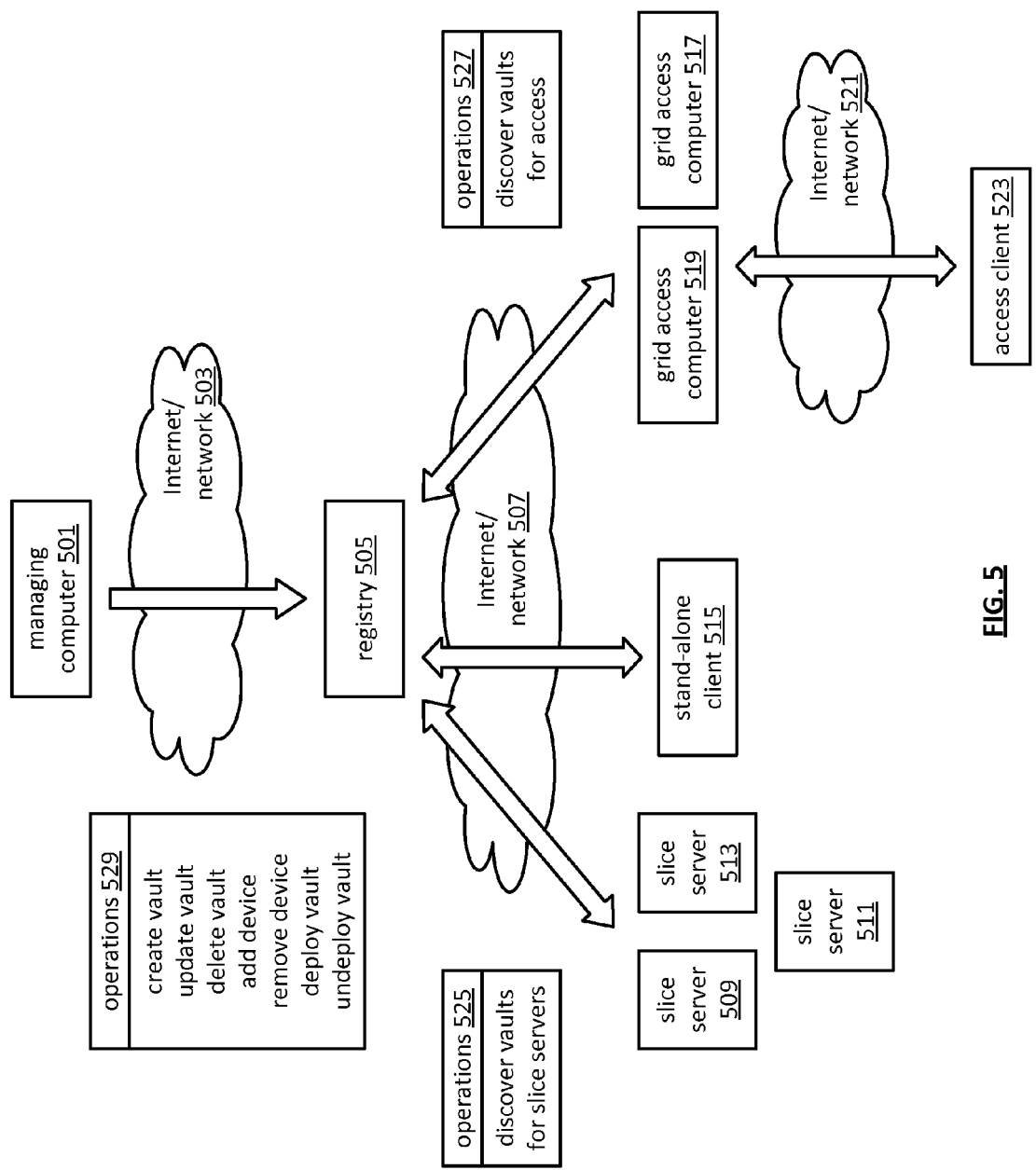
FIG. 5 is a network diagram illustrating communications between the registry and other devices used to implement a plurality of virtual dispersed data storage containers as implemented by one embodiment of the disclosed invention.

Detailed Description of the Improved Central Registry Adapted TO Identify Accessible Virtual Dispersed Data Storage Containers Returning to the Figures, and to FIG. 5 in particular, a dispersed data storage network 500 utilizing a central registry 505 for storing network configuration information is depicted. The dispersed data storage network 500 also comprises a plurality of slice servers 509, 511, and 513 for storing dispersed data, a manager computer 501 for deploying and configuring vaults and devices, one or more grid access computers 517 and 519, an access client 523, and a standalone client 515. As depicted, the access client 523 accesses one or more grid access computers 517 and 519 through a network 521 of some kind, such as the Internet. In addition, the manager computer 501 communicates with the registry computer 505 through a network 503. Moreover, the plurality of slice servers, 509, 511, and 513, which could be of any number greater than 1, the grid access computers 517 and 519, and the standalone client 515, communicate with the remainder of the dispersed data storage network through a network 507.

The registry computer hosts a registry application that serves as a central storage location for three classes of information: 1) vault configuration information, 2) device configuration information, and 3) vault deployment information. As explained earlier, a vault is a software construct implementing a virtual dispersed data storage container associated with a user or group account. Multiple vaults can be implemented using the same set of slice servers, and different configurations of overlapping or separate slice server configurations can be used to implement different vaults; by example, and without limitation, slice servers A, B, C, and D can implement vault I, while slice servers B, C, F, and G can implement vault II, etc.

The manager computer 501 is used to create and configure vaults, and to associate, or deploy, devices with vaults. The manager computer 501 interacts with the registry computer 505 through different operations 529, each of which will create or affect one or more information records maintained by the registry computer 505. The information records maintained by the registry computer may be maintained in a discrete or distributed database. As the registry may be conceptualized as providing directory services for one or more VDDSCs, the LDAP protocol could, in one embodiment of the disclosed invention, be used to create, modify, and delete information records maintained by the registry. It will be understood by those skilled in the art that other directory access protocols could be used, or that an entirely new protocol, unique to the disclosed registry, could be used instead.

Figure 6:
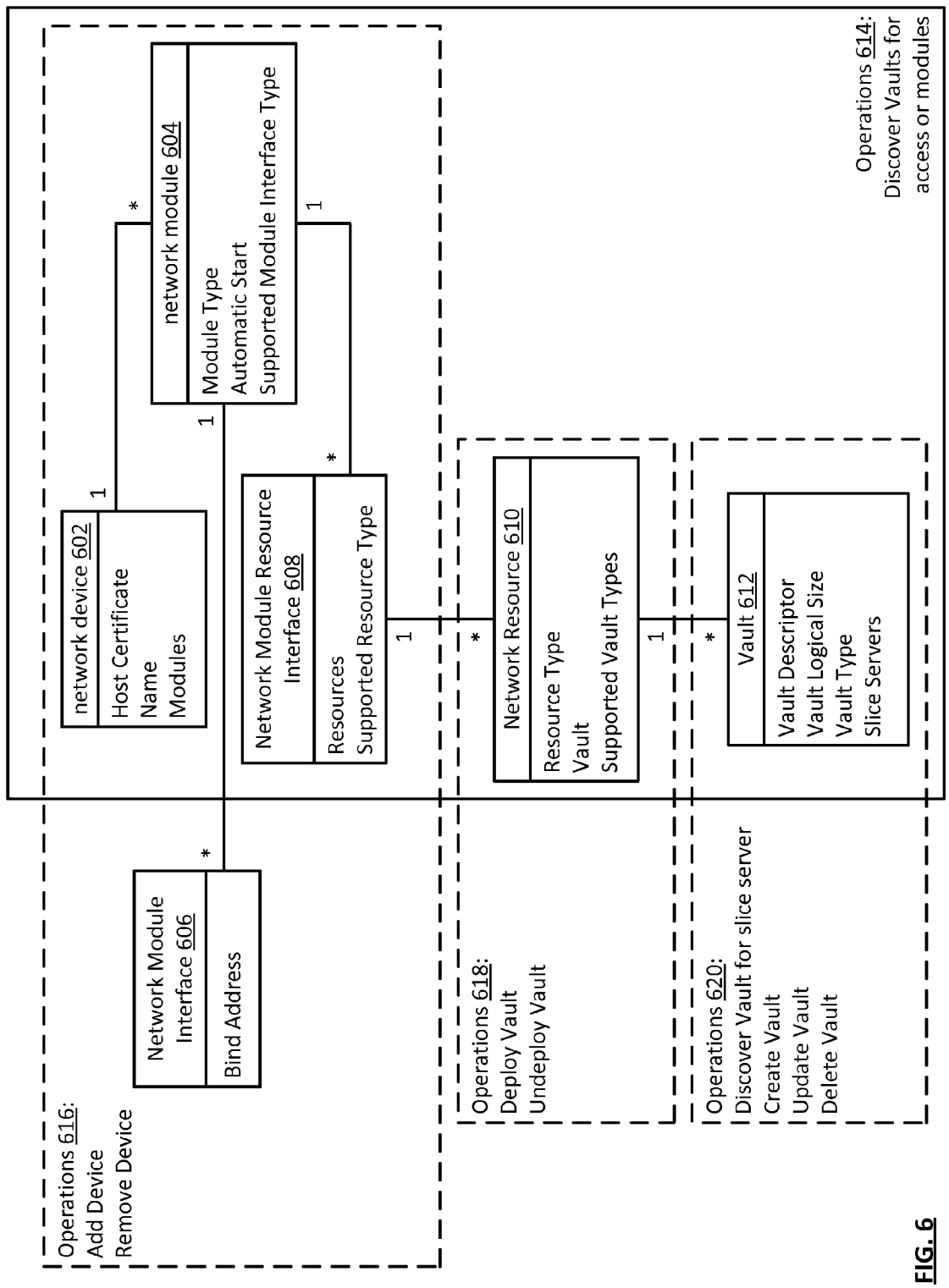
FIG. 6 illustrates one possible data model for use by the registry in maintaining information describing the configuration of devices and vaults as implemented by one embodiment of the disclosed invention.

Turning to FIG. 6, the data exchanged between the manager computer 501 and the registry computer 505 is illustrated. When performing a discover vault operation 614 from an access module, an LDAP read message may be sent to the registry computer 505. When fulfilling a discover vault operation directed to an access module, all data objects shown within the solid line portion of FIG. 6 will be returned. These data objects are discussed below.

Each Network Device Object specifies a host certificate, a unique name for the device, and one or more Network Module Objects 604. A host certificate uniquely and securely specifies a device, such as a slice server, grid access computer, or a different type of device that provides services to the dispersed data storage network.

Each network module object 604 specifies a module type, whether the module is automatically started or must be manually started, and a supported module interface type. The module type field specifies the type of function supported by the module, such as, for example, whether the module implements 1) an accesser providing an iSCSI gateway to provide block based access for clients to VDDSCs, 2) an accesser providing a WebDAV gateway to provide clients with HTTP file share access to VDDSCs, 3) a rebuilder for rebuilding corrupted data slices stored by a collection of slice servers implementing a dispersed data storage network, or 4) a slice server program for storing data slices. The supported module interface type field may be used for sanity checking.

Each network module resource type object 608 specifies one or more network resource objects 610 as well as the supported resource type, which may be used for sanity checking.

Each network resource object 610 specifies the resource type, a vault object 612 specifying the vault the resource provides access to, and the supported vault types, which may be used for sanity checking The resource type field specifies the mechanism by which the network resource enables accessing the listed vault, such as, for example, iSCSI, WebDAV, FTP, etc.

Each vault object 612 specifies a vault descriptor, the vault logical size, which defines the maximum amount of data the vault can store, the vault type, which indicates to a grid access computer or standalone client what sort of data handling code should be loaded and, in the case of a grid access computer, how the vault should be represented to clients. A vault descriptor specifies the vault configuration, including the Information Dispersal Algorithm used by the vault, other codecs, such as encryption and compression schemes used to store data, and a unique identifier for the newly created vault.

Accordingly, a discover vault operation will return a plurality of network device objects 602 corresponding to the different devices known to the registry computer 505 and accessible to the querying device. In addition, for each network device object 602 returned, one or more network module objects 604 will be returned as well, corresponding to the different services available on each device. For each network module object 604 enumerated, one or more network module resource interface objects 608 will be enumerated as well, each listing one or more network resource objects 610. Each network resource object corresponds to a mechanism of accessing a vault, such as iSCSI, FTP, WebDAV, or Simple Object. Finally, each network resource object 610 specifies a single vault object 612, which corresponds to the vaults accessible by the querying device.

Device operations exchange the type of data specified in the dashed box labeled 616. When performing an add device operation, a network device object 602 is created in memory corresponding with the added device. As discussed earlier, a network device can be any persistent device operating on the dispersed data storage network that provides services to the DDSN, such as, for example, a slice server or grid access computer. As appropriate to the added device, a number of network module objects 604 may also be created in memory. For each network module object 604, a network module interface object 606 will also be created. Network module interface objects 606 represent the mechanism by which a network module provides services to the network, such as, for example, in a TCP/IP implementation, the specific address and port combination on which the service is available. After the necessary objects are created in memory, the add device operation may be implemented by sending an LDAP store message containing the object structures to the registry computer 505, which will add a device record to its directory.

When performing a remove device operation, the network device object 602 corresponding to the device to be removed is specified. Any related objects, such as network module objects 604, network module interface objects 604, and network module resource interface objects 608, are also deleted. The remove device operation may be implemented by sending an LDAP delete message to the registry computer 505 specifying the network device object 602 to delete. The registry computer 505 will then delete the corresponding device from its directory.

Vault deployment operations 618 exchange the type of data specified by the dashed box labeled 618 with the registry computer 505. While a vault "exists" in the sense that it has a certain amount of storage allocated on various slice servers prior to deployment, vaults are not accessible by network users until they are deployed. When performing a deploy vault operation, a network resource object 610 corresponding to the vault and means of access for the vault is created in memory. The deploy vault operation may be implemented by sending an LDAP store message specifying the network resource object 610 to the registry computer 505. The registry computer 505 will then update its directory to indicate the deployment of the specified vault using the access means specified in the network resource object 610.

When performing an un-deploy vault operation, a network resource object 610 is specified and deleted. All associated objects will be destroyed or released as appropriate, and the vault will become inaccessible through an access computer until re-deployed. However, all storage associated with the vault will remain allocated and intact and any stand-alone clients may still access the vault. The un-deploy vault operation may be implemented by sending an LDAP delete message specifying the network resource object 610 corresponding to the vault deployment that is to be deactivated to the registry computer 505. The registry computer 505 then updates its directory to indicate that the vault specified by the sent network resource object 610 is no longer deployed. Any objects referenced by the network resource object 610 are also destroyed or released from the registry as appropriate.

Vault operations 620 exchange vault objects 612 with the registry computer 505. When a slice server performs a discover vault operation, one or more vault objects 612 are enumerated to the slice server, representing the vaults that the slice server stores data for. This operation may be implemented using an LDAP read message.

When performing a create vault operation, a vault object 612 is created in memory. The create vault operation may be implemented by sending a store message specifying the created vault object 612 to the registry computer 505. The registry computer 505 then creates an information record corresponding to the new vault, and updates its information records accordingly.

When performing an update vault operation, a vault object 612 is read from the registry computer 505 using an LDAP read message. The vault object 612 is then modified appropriately. The registry computer 505 may be updated using an LDAP store message specifying the modified vault object 612. The registry computer 505 then updates the information record corresponding to the updated vault. If the slice servers associated with the vault are changed so that certain slice servers that were associated with the vault become disassociated, data may be automatically migrated from the disassociated slice servers to slice servers that are newly or still associated with the vault. One possible way of doing this would be to assemble each affected data segment, re-slice the affected data segments using the appropriate information dispersal algorithm, and store the new data slices as appropriate to the updated list of slice servers.

When performing a delete vault operation, the vault object 612 corresponding to the vault to be deleted is specified. Any related objects will also be deleted or released as appropriate. The delete vault operation may be implemented by sending an LDAP delete message to the registry computer 505 specifying the vault object 612 to delete. The registry computer 505 will then delete the corresponding vault from its directory, and either delete or release any other related objects as appropriate. When a vault is deleted, the vault's unique identifier is added to a global "deleted vaults" list, which may be maintained by the registry. In one embodiment of the disclosed invention, data stored by slice servers corresponding to deleted vaults may be automatically erased. For example, a daemon or service operating on the registry computer 505 or another computer may periodically query the deleted vaults list, and instruct the slice servers storing data associated with those vaults to purge any data slices that the slice server stores associated with the deleted vault. In a separate embodiment, the registry computer 505 may automatically notify each affected slice server of a deleted vault, and in yet another embodiment, each slice server may periodically query the deleted vaults list from the registry computer 505.

Figure 7:
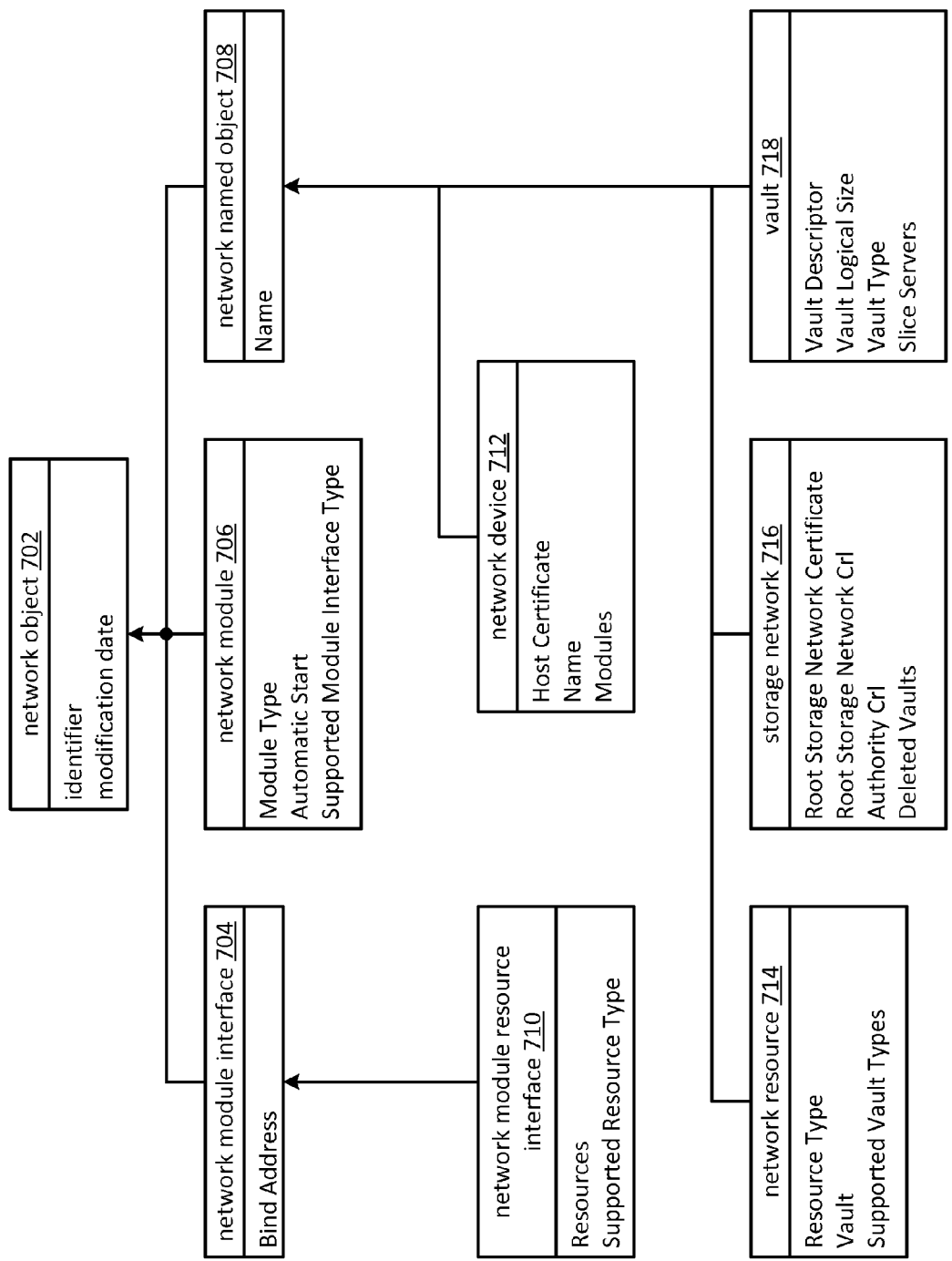
FIG. 7 is a simplified class diagram of the classes used to implement the registry as implemented by one embodiment of the disclosed invention.

FIG. 7 depicts the data scheme used by the registry. Generally, the registry stores entries and entry relationships. An entry is a data object that is updated atomically, while an entry relationship is an association between entries that result from a particular entry listing a different entry as an attribute. All entries are strongly typed, meaning that attributes may not be added to an entry if the entry belongs to a class that does not support the attribute.

The network object class 702 is the base object class for all registry entries. The network object class specifies an identifier and a modification date. The network module interface class 704 descends from the network object class 702, and specifies a network address for a network object. The network module class 706 specifies the type of module, such as access or rebuilder, whether the module automatically starts or must be manually started, and the supported module interface type. The network named object class 708 specifies a name for a named object, and serves as the base class for the network device 712, network resource 714, storage network 716, and vault 718 classes.

The network device class 712 is associated with a particular device, such as a particular server, utilized by a dispersed data storage network. It specifies a host certificate, which identifies the device. The host certificate is used to provide secure access to one or more implemented virtual dispersed data storage containers. The network device class 712 also specifies a name, a unique device identifier, and a list of modules resident on the device.

The network resource class 714 specifies a resource type, such as WebDAV, FTP, iSCSI, or another type of file, block, or object access protocol, as well as a specific vault and the supported vault types, which is used for sanity checking.

The storage network class 716 specifies general information about a dispersed storage network, such as general security information. In one embodiment, the storage network class also specifies the deleted vault list.

The vault class 718 specifies a specific vault operable within the dispersed storage network. In particular the vault class 718 specifies a vault descriptor, the logical size of the vault, the type of the vault, a vault name, an identifier uniquely identifying the vault, and a list of slice servers used to implement the vault.

The network module resource interface class 710 specifies a list of network resources with which a network module resource interface object is associated with, as well as the supported resource type.

Figure 8:
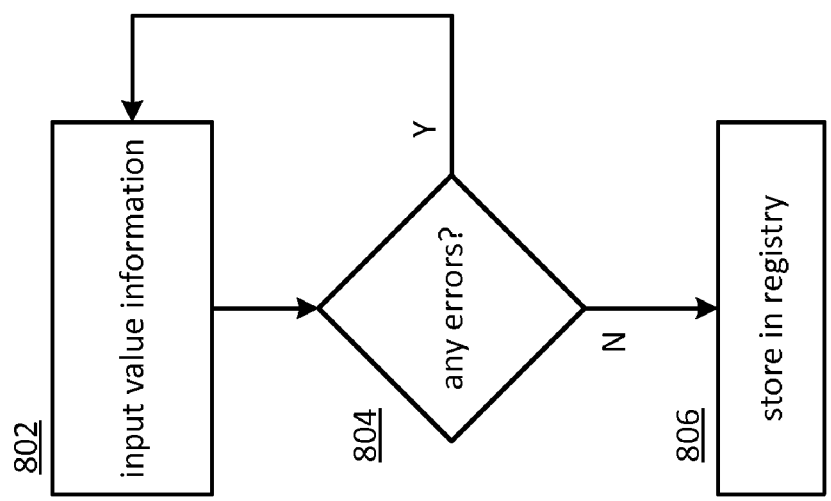
FIG. 8 is a simplified flow chart illustrating the process of checking for errors in input vault information as implemented by one embodiment of the disclosed invention.

FIG. 8 is a flowchart illustrating the process of inputting information into the registry when performing a create vault, update vault, or delete vault operation from the manager computer 501. In one embodiment of the disclosed invention, the manager computer 501 is responsible for ensuring that information input into the registry computer 505 is correct. It should be appreciated that this is not a limitation of the invention; other members of the dispersed data storage network, such as the registry computer 505, could assume this responsibility. The manager computer 501 will receive input vault information in step 802, and check the vault information for any errors in step 804. If there are errors, the process returns to step 802. However, if the information passes all error checks, such as those for semantics or incorrect vault and device associations, the information is stored in the registry in step 806.

Figure 9:
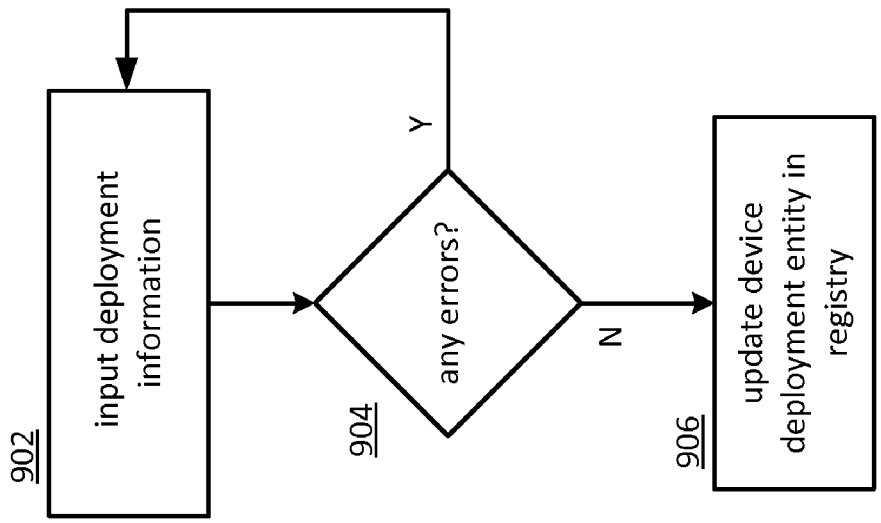
FIG. 9 is a simplified flow chart illustrating the process of checking for errors in input vault information as implemented by one embodiment of the disclosed invention.

FIG. 9 is a flowchart illustrating the process of inputting deployment information into the registry when performing deploy vault and un-deploy vault operations. In one embodiment, the manager computer 501 receives input deployment information in step 902 and checks the deployment information for any errors in step 904. If there are errors, the process returns to step 902. However, if the information passes all error checks, the information is stored in the registry in step 906.

FIG. 10 is a flowchart illustrating the process of inputting device information into the registry when performing add device and remove device operations. In one embodiment, the manager computer 501 receives input device information in step 1002, and checks the device information for any errors in step 1004. If there are errors, the process returns to step 1002. However, if the information passes all error checks, the information is stored in the registry in step 1006.

Figure 11:
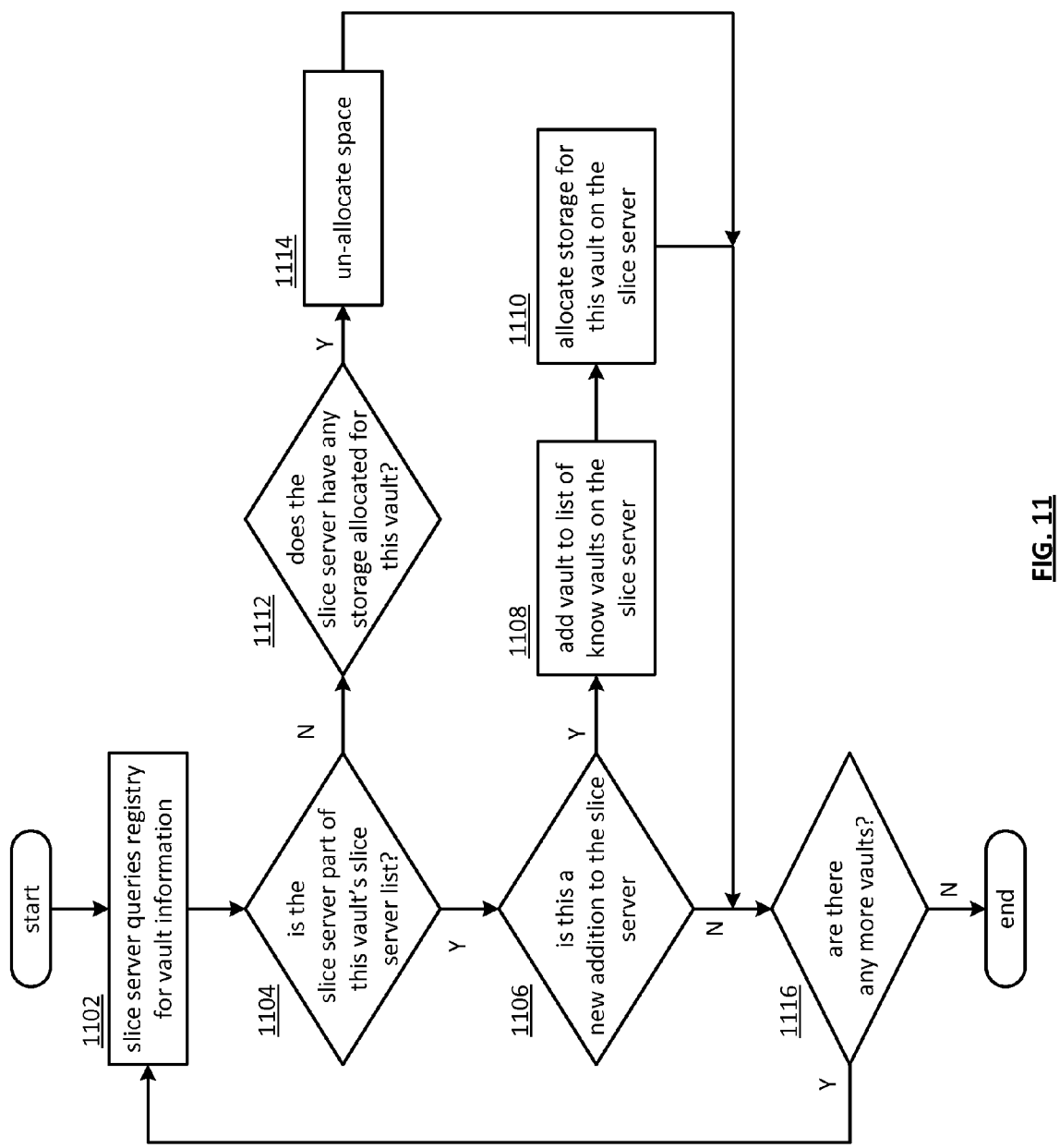
FIG. 11 is a simplified flow chart illustrating one possible process by which a slice server could query the registry for vaults associated with the slice server as implemented by one embodiment of the disclosed invention.

FIG. 11 illustrates the process by which a slice server can query the registry for information describing the vaults that the slice server is associated with. A slice server requires this information to properly store data slices associated with a vault. In one embodiment, the slice server could query the registry immediately after startup and then periodically query the registry to obtain updated information. However, other mechanisms could be used, such as, for example, the registry computer 505 could push updated information to each slice server. It should be understood that the mechanism by which a slice server updates vault information is not a limitation of the disclosed invention.

In step 1102, the slice server queries the registry computer 505 and obtains complete information describing a vault. In step 1104, the slice server then determines if it is associated with the enumerated vault by looking for its own slice server identifier in the list of slice servers associated with the enumerated vault. If the slice server is not associated with the enumerated vault, the slice server then determines if there is any storage associated with the enumerated vault in step 1112. If so, the slice server un-allocates this space in step 1114, and moves onto step 1116 which determines if there any additional vaults to be obtained from the registry.

On the other hand, in step 1106, if the slice server is associated with the enumerated vault, the slice server determines if it was not associated with the enumerated vault prior to the latest enumeration by checking to see if it already has allocated space for use with the enumerated vault. If the slice server is newly associated with the enumerated vault, the slice server adds the enumerated vault to its list of known vaults in step 1108, along with pertinent information about the vault, such as the format for storing data slices, and the logical size of the vault. The slice server then allocates storage space in step 1110. Operation then transitions to step 1116 which determines whether there are any additional vaults, and if so, the process continues with the enumeration of the next vault in step 1102.

Figure 12:
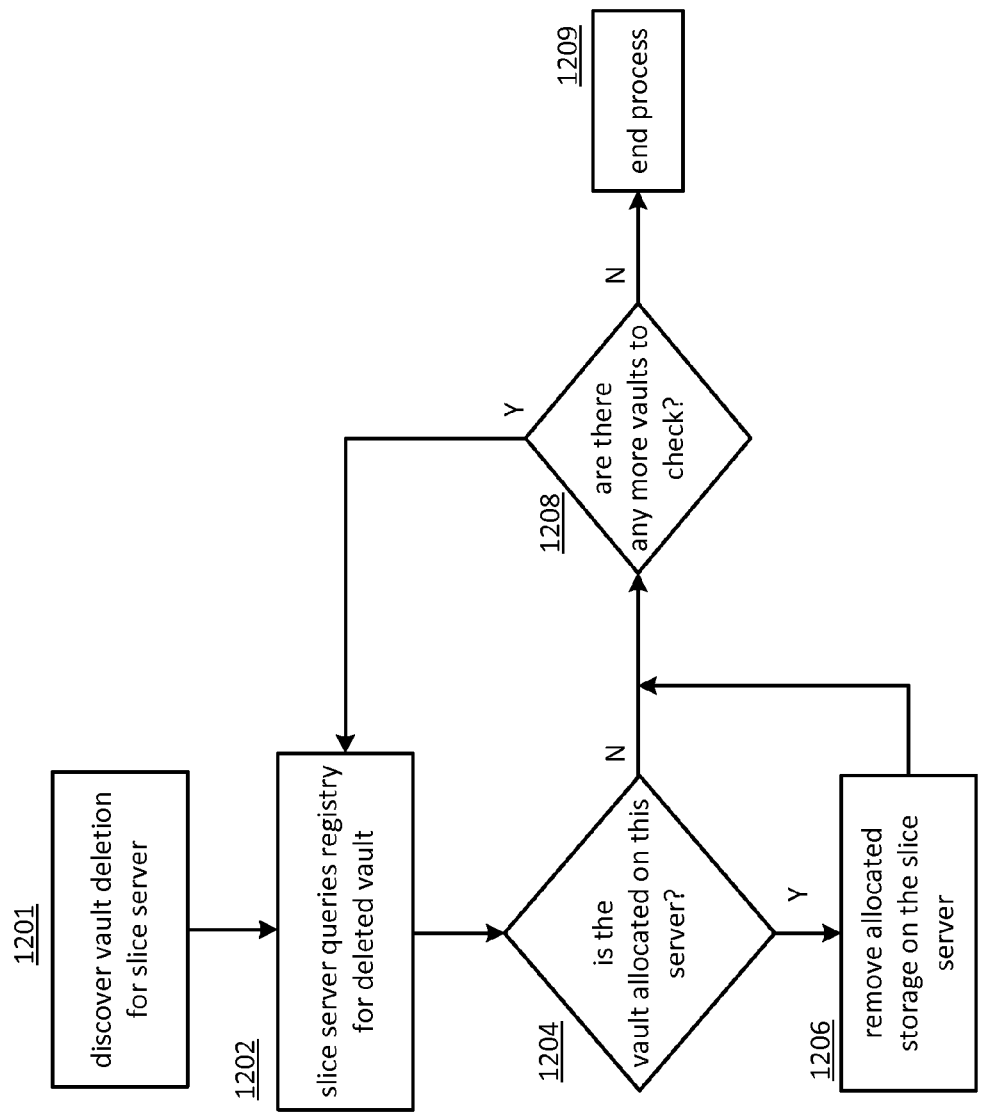
FIG. 12 is a simplified flow chart illustrating one possible process by which a slice server could query the registry for deleted vaults as implemented by one embodiment of the disclosed invention.
Figure 13:
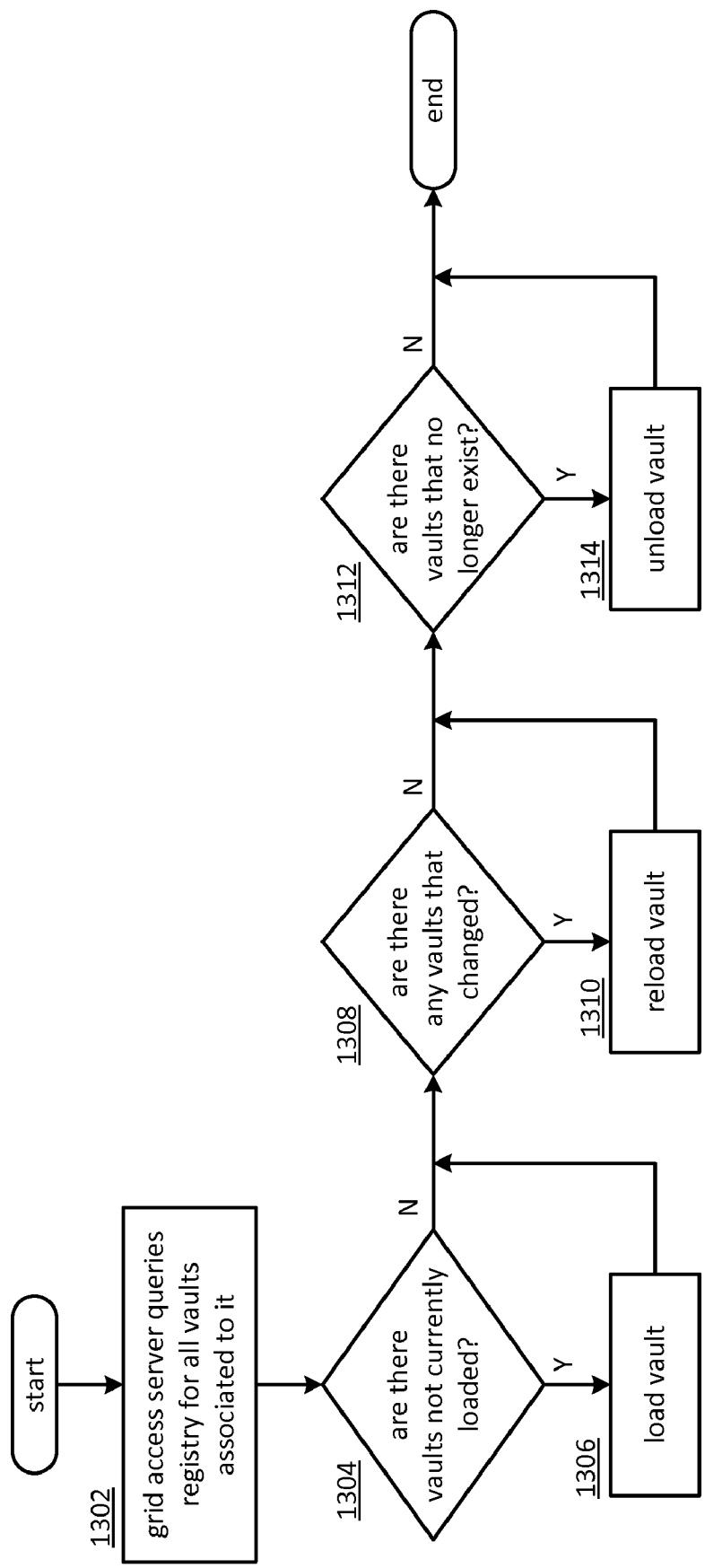
FIG. 13 is a simplified flow chart illustrating one possible process by which an accesser could query the registry for vaults associated with the accesser as implemented by one embodiment of the disclosed invention.

FIG. 12 depicts the process by which a slice server could query information from the registry computer 505 to determine if there are vaults with which the slice server had been associated with, but which it is no longer associated with. One way that this could be accomplished would be for the slice server to iterate through all slice servers it was associated with, and, for those vaults for which the slice server is no longer associated with, release any allocated storage. One problem with such an approach would be that data loss could occur in the instance of an I/O error, such as, for example, where a vault entry is not returned erroneously. Accordingly, in one embodiment, the slice server does not release allocated storage until it receives a signal from the registry instructing it to do so. In particular, in one embodiment, the registry constructs a list of deleted vaults, and the slice server periodically queries for the list.

Beginning in step 1201, the registry computer 501 assembles a deleted vault list. The slice server then queries the registry computer 505 to determine if a particular vault is on the deleted vault list in step 1202. In step 1204, the slice server determines if it has allocated storage associated with the vault. If so, storage allocated to that vault is released in step 1206. The process then proceeds to step 1208, where, if the slice server has more vaults to check, operation resumes in step 1202. Otherwise, the process is ended in step 1209.

Accesser modules provide access to a dispersed data storage network to clients. Accesser modules can be integrated into a standalone client, or can function as a gateway for access clients. In one embodiment, accesser modules determine what services they must provide for vaults by querying the registry. Each accesser module will query the registry at startup, and then periodically during embodiment. It should be appreciated that this information could also be pushed to accesser modules, and the act of querying the registry for this information is not a limitation of the invention. After an accesser module queries the registry, it will utilize two pertinent lists. The first list contains vaults that the accesser should load. The second list contains vaults that the accesser has already loaded. The accesser then compiles the two lists into three lists: 1) a list of vaults to be loaded, enumerating vaults that should be loaded but are not presently loaded, 2) a list of vaults to be re-loaded, which enumerates vaults that are already loaded, but which will be reloaded to effect changes that have occurred, and 3) a list of vaults to be unloaded, which enumerates vaults that are already loaded, but should not be.

In step 1302, the accesser module queries the registry computer 505 for all vaults associated with it. In step 1304, the accesser module determines if any of the vaults enumerated on the list returned by the registry computer are not already loaded. If so, in step 1306, those vaults are loaded. If not, operation resumes in step 1308, where the accesser module determines if any of the vaults that are already loaded have changed. If so, those vaults are reloaded in step 1310. If not, operation resumes in step 1312. In step 1312, the accesser module determines if it has any vaults loaded that are no longer associated with the accesser module. If so, those vaults are unloaded in step 1314.

The foregoing description of the invention has been presented for purposes of illustration and description, and is not intended to be exhaustive or to limit the invention to the precise form disclosed. The description was selected to best explain the principles of the invention and practical application of these principles to enable others skilled in the art to best utilize the invention in various embodiments and various modifications as are suited to the particular use contemplated. It is intended that the scope of the invention not be limited by the specification, but be defined by the claims set forth below.

What is claimed is:

1. A system comprising:
a computer including:
a network port adaptively coupled to a network; and
a registry application;
a database for storing a plurality of information records, wherein an information record of the plurality of information records includes:
a vault identifier to identify a virtual dispersed data storage container;
a list of associated slices servers, wherein the associated slice servers store a plurality of data slices within the virtual dispersed data storage container, wherein a data segment is encoded using an information dispersal algorithm to produce the plurality of data slices; and
a list of one or more associated devices;
wherein the computer:
receives, via the network port, a message regarding the virtual dispersed data storage container from a requesting device;
interprets the message to determine a requested operation;
determines whether the information record of the plurality of information records corresponds to the requested operation;
when the information record corresponds to the requested operation, determines whether the requested operation is valid; and
when the requested operation is valid:
performs the requested operation; and
updates the information record corresponding to the requested operation.

2. The system of claim 1 wherein the requested operation comprises at least one of: create a vault, update a vault, delete a vault, add a device to the information record corresponding to the requested operation, remove a device from the information record corresponding to the requested operation, deploy a vault, and undeploy a vault.

3. The system of claim 1 wherein the requested operation comprises:
a request to identify virtual dispersed data storage containers accessible to the requesting device; and
wherein, in response to the request, the registry application retrieves one or more of the plurality of information records, wherein each retrieved information record corresponds to an accessible virtual dispersed data storage container of the requesting device.

4. The system of claim 3 wherein the requesting device comprises at least one of: a grid access computer, a standalone computer, and an access client computer.

5. The system of claim 1 wherein the requested operation comprises:
a request to create a virtual dispersed data storage container; and
wherein, in response to the request, the registry application;
creates a new information record to include a second vault identifier to identify a second virtual dispersed data storage container, a second list of associated slices servers, and a second list of one or more associated device; and transmit, via the network port, the new information record to the database for storage therein.

6. The system of claim 1, wherein the information record further comprises at least one of:
a network device object;
a network module object;
a network module interface object;
a network module resource interface object;
a network resource object;
information regarding the information dispersal algorithm; and
a vault object.

7. A computer comprises:
a network port;
a central processing unit operably coupled to the network port; and
memory operably coupled to the central processing unit, wherein the central processing unit functions to:
receive, via the network port, a discover vault request for a virtual digital data storage vault container;
determine whether an information record exists for the virtual digital data storage vault container;
when the information record does not exist for the virtual digital data storage vault container:
create an information record for the virtual digital data storage vault container, wherein the information record identifies valid user accounts, a set of slice servers, and information regarding an information dispersal algorithm that will be used to store a plurality of data slices within the set of slice servers, wherein a data segment is encoded using the information dispersal algorithm to produce the plurality of data slices; and
deploy the virtual digital data storage vault container.

8. The computer of claim 7, wherein the central processing unit further functions to:
when the information record exists, interpret the discover vault request to determine whether the valid user accounts are to be modified; and
when the valid user accounts are to be modified, modifying the information record to add or remove a user account from the valid user accounts.

9. The computer of claim 7, wherein the central processing unit further functions to:
when the information record exists, interpret the discover vault request to determine whether module type information of one or more of the valid user accounts is to be modified; and
when the module type information of the one or more of the valid user accounts is to be modified, modify the module type information.

10. The computer of claim 7, wherein the central processing unit further functions to:
when the information record exists, interpret the discover vault request to determine whether a vault object of the information record is to be modified; and
when the vault object is to be modified, modify at least one of a descriptor, a logic size, a type, and the set of slice servers within the vault object.

11. The computer of claim 7, wherein the central processing unit further functions to:
when the information record exists, interpret the discover vault request to determine whether a vault is to be deleted; and
when a vault is to be deleted, modify the information record to delete the vault.

12. The computer of claim 7, wherein the central processing unit further functions to:
when the information record exists, interpret the discover vault request to determine whether a vault is to be undeployed; and
when a vault is to be deleted, modify the information record to undeploy the vault.

13. The computer of claim 7, wherein the receiving, via the network port, the discover vault request further comprises at least one of:
receiving, via the network port, the discover vault request from a slice server of the set of slice servers; and
receiving, via the network port, the discover vault request from a device associated with one or more of the valid user accounts.

* * * * *